United States Patent [19]
Hashiuchi et al.

[11] Patent Number: 6,013,193
[45] Date of Patent: Jan. 11, 2000

[54] MAGNETITE PARTICLES AND PROCESS FOR PRODUCTION THEREOF

[75] Inventors: Masachika Hashiuchi; Takeshi Miyazono; Masahiro Miwa, all of Tamano, Japan

[73] Assignee: Mitsui Mining & Smelting Company, Ltd., Japan

[21] Appl. No.: 09/157,992

[22] Filed: Sep. 22, 1998

[30] Foreign Application Priority Data

Sep. 25, 1997 [JP] Japan ..................... 9-259665
Apr. 9, 1998 [JP] Japan ..................... 10-097306

[51] Int. Cl.[7] .................. C01G 49/08; G03G 9/083; H01F 1/11
[52] U.S. Cl. .................. 252/62.59; 252/62.62; 252/62.6; 252/62.64; 252/62.58; 252/62.57
[58] Field of Search ............ 252/62.59, 62.62, 252/62.6, 62.58, 62.64, 62.57

[56] References Cited

U.S. PATENT DOCUMENTS

| | | | |
|---|---|---|---|
| 5,356,712 | 10/1994 | Hashiuchi et al. | 252/62.59 |
| 5,663,026 | 9/1997 | Kasuya et al. | 430/106 |
| 5,759,435 | 6/1998 | Miyazono et al. | 252/62.59 |

FOREIGN PATENT DOCUMENTS

| | | |
|---|---|---|
| 0247884 | 12/1987 | European Pat. Off. . |
| 0532315 | 3/1993 | European Pat. Off. . |
| 0652490 | 5/1995 | European Pat. Off. . |
| 0750233 | 12/1996 | European Pat. Off. . |
| 0808801 | 11/1997 | European Pat. Off. . |
| 0826635 | 3/1998 | European Pat. Off. . |

*Primary Examiner*—C. Melissa Koslow
*Attorney, Agent, or Firm*—Bierman, Muserlian and Lucas

[57] ABSTRACT

Magnetite particles continuously containing 0.2 to 1.0 wt. %, based on magnetite, of a silicon component expressed as silicon, in a region ranging from the center to the surface of the particle; 0.01 to 0.3 wt. % of the silicon component being exposed on the surface of the particle; and an outer shell of the particle being coated with a metal compound comprising at least one metal component bound to the silicon component, the metal component being selected from the group consisting of Zn, Mn, Cu, Ni, Co, Cr, Cd, Al, Sn, Mg, Ti and Ce, and a process for preparing the particles.

5 Claims, No Drawings

MAGNETITE PARTICLES AND PROCESS FOR PRODUCTION THEREOF

BACKGROUND OF THE INVENTION

1. Field of the Invention

The present invention relates to magnetite particles. More particularly, the invention relates to magnetite particles which have a silicon component, and a metal element other than iron, both at the center of and on the surface of the particle, and in which the amounts of the silicon component and the metal element dispersed near the surface of the particle, and the amount of the silicon component exposed on the surface of the particle are controlled, whereby the properties of the magnetite particles, such as oil absorption, electrical resistance, magnetic characteristics, and environmental resistance, are improved in a well-balanced manner. Thus, the magnetite particles are mainly used in magnetic toners for electrostatic copying, and black pigment powders for paints. The invention also concerns a process for producing such magnetite particles.

2. Description of the Related Art

Recently, magnetite particles produced by a reaction in an aqueous solution have been widely used in a magnetic toner for electrophotographic copiers or printers. Various general development characteristics are required of the magnetic toner. With the progress of electrophotographic technologies in recent years, rapid advances have been made, particularly in copiers and printers employing digital techniques. Thus, more advanced properties have been required of them. In detail, outputs such as graphics or photographs have been required in addition to conventional character outputs. Among the printers, in particular, those capable of printing 1,200 dots or more per inch have appeared, making latent images on the photoconductor even more meticulous. Thus, there is an intense demand for high reproducibility of thin lines by development.

Japanese Unexamined Patent Publication No. 72801/93, for example, discloses a magnetic toner wherein a magnetic powder with high resistance and good flowability is desired.

In disclosures of magnetic toners made in Japanese Unexamined Patent Publication No. 100474/93, magnetic iron oxide is described as still requiring an improvement in environmental resistance. As disclosed there, a magnetic powder is desired which not only possesses the required properties for production of a toner, but is also excellent in environmental resistance (moisture resistance).

Likewise, Japanese Unexamined Patent Publication No. 239571/95 points out that the environmental resistance of a magnetic powder, especially under hot humid conditions, is problematical.

According to what is disclosed about a magnetic toner in Japanese Unexamined Patent Publication No. 1160/91, high resistance and low hygroscopicity are needed to show the required performance in diverse environments. To eliminate scatter over images, a magnetic toner should be low in coercive force and residual magnetization.

In short, to fulfill the above-described requirements, it is necessary to provide a magnetic powder having the usually required properties, and well balanced in resistance, flowability, environmental resistance, and magnetic characteristics.

With this background, various improvements have been achieved in magnetite particles. Japanese Unexamined Patent Publication Nos. 155223/86, 278131/87, and 24412/87, for instance, disclose magnetite particles containing a silicon component only inside the particle. These particles give an image quality with improved image density, but the image quality is still insufficient. Furthermore, the magnetite particles proposed by these publications are poor in flowability, and the packing density of the powder becomes too high because of vibrations during transportation, and so forth. This poses the problem of considerably lowering an operating efficiency for production of a toner.

Japanese Unexamined Patent Publication No. 213620/93 discloses magnetite particles containing a silicon component at the center and on the surface thereof, and having well balanced residual magnetization, satisfactory flowability, and high electrical resistance. These particles give an image quality with improved thin line reproducibility, but are problematical in environmental stability because of hygroscopicity.

Japanese Unexamined Patent Publication No. 267646/95 discloses the production of a magnetic powder excellent in resistance to moisture absorption and magnetic characteristics by the use of silicic acid anhydride. However, the silicon component used is silicic acid anhydride, which is added in the course of the reaction for forming particles. Thus, silicic acid anhydride is present as independent fine particles in the resulting magnetite particles. In addition, no silicon component is present at the center of the magnetite particle. Thus, residual magnetization is high, and flowability is still insufficient.

Japanese Unexamined Patent Publication No. 59025/97 discloses a magnetic powder having high flowability and blackness obtained by the use of silicon, etc. However, the coercive force is high compared with the particle size, so that the improvement in thin line reproducibility of images and the flowability are still far from satisfactory.

SUMMARY OF THE INVENTION

The present invention has solved the above-described problems with the earlier technologies. Its object is to provide magnetite particles low in residual magnetization and coercive force, high in electrical resistance, and excellent in operating efficiency, flowability, dispersibility and environmental resistance; and a process for producing the magnetite particles.

The present invention, as a result of in-depth studies to attain the above object, achieves this object by incorporating a silicon component, and a metal component other than iron, into the center of magnetite particles; coating an outer shell of the particles with a metal compound comprising at least one metal component bound to the silicon component, the metal component being selected from the group consisting of Zn, Mn, Cu, Ni, Co, Cr, Cd, Al, Sn, Mg, Ti and Ce; and having 0.01 to 0.3 wt. % of the silicon component exposed on the surface of the particles.

The outer shell of the particle in the present invention refers to a portion in which the iron (Fe), if dissolved from the surface of the particle, has been dissolved to a depth corresponding to a volume of 40 wt. % based on the total Fe content of the particle. A region from the site of the depth to the center of the particle is deemed to be an inner shell.

According to a first aspect of the present invention, there are provided magnetite particles continuously containing 0.2 to 1.0 wt. %, based on magnetite, of a silicon component expressed as silicon, in a region ranging from the center to the surface of the particle; 0.01 to 0.3 wt. % of the silicon component being exposed on the surface of the particle; and an outer shell of the particle being coated with a metal compound comprising at least one metal component bound to the silicon component, the metal component being selected from the group consisting of Zn, Mn, Cu, Ni, Co, Cr, Cd, Al, Sn, Mg, Ti and Ce. In the description to follow, the amount of the silicon component refers to the amount of silicon.

According to a second aspect of the invention, there are provided the magnetite particles of the first aspect in which a gradient is provided such that the concentration, based on Fe, of any of the Zn, Mn, Cu, Ni, Co, Cr, Cd, Al, Sn, Mg, Ti and Ce components is higher in the outer shell than in an inner shell of the magnetite particle and also higher in a superficial portion of the outer shell, and the total amount of any of the Zn, Mn, Cu, Ni, Co, Cr, Cd, Al, Sn, Mg, Ti and Ce components in the entire particle is 0.2 to 4.0 wt. %, based on the magnetite particle, expressed as any of the respective metal elements.

According to a third aspect of the invention, there are provided the magnetite particles of the first or second aspect, which have an oil absorption of not more than 20 ml/100 g, an electrical resistance of not lower than $1 \times 10^4$ Ωcm, and a moisture content, after moisture absorption under high-temperature, high-humidity conditions, of not more than 0.5%.

According to a fourth aspect of the invention, there are provided the magnetite particles of the first or second aspect, which have a residual magnetization $\sigma_r$ of not more than 6 emu/g, and a degree of agglomeration of not higher than 35%.

According to a fifth aspect of the invention, there is provided a process for producing magnetite particles, which comprises mixing an aqueous solution consisting essentially of a ferrous salt, a silicon component, and 1.0 to 1.1 equivalents, based on iron, of an alkali metal base; performing an oxidation reaction of the mixture while maintaining its pH at 7 to 10; adding iron, in a supplementary amount corresponding to 0.9 to 1.2 equivalents based on the initial alkali metal base, during the reaction; continuing the oxidation reaction while maintaining the mixture at a pH of 6 to 10; and adding at least one metal component selected from the group consisting of Zn, Mn, Cu, Ni, Co, Cr, Cd, Al, Sn, Mg, Ti and Ce, after the addition of the supplementary amount of iron, but before completion of the oxidation reaction, while adjusting the concentration of the metal component(s) to be higher in an outer shell portion and a superficial portion of the particle.

PREFERRED EMBODIMENTS OF THE INVENTION

The preferred embodiments of the present invention will now be described in detail.

The magnetite particles of the present invention have the following features:

① 0.2 to 1.0 wt. %, based on magnetite, of a silicon component expressed as silicon is contained continuously in a region ranging from the center to the surface of the particle.

② 0.01 to 0.3 wt. % of the silicon component is exposed on the surface of the particle.

③ An outer shell of the particle is coated with a metal compound comprising at least one metal component bound to the silicon component, the metal component being selected from the group consisting of Zn, Mn, Cu, Ni, Co, Cr, Cd, Al, Sn, Mg, Ti and Ce.

The magnetite particles of the present invention require that the silicon component in the particle be contained continuously in the region from the center to the surface, and that silicon be contained in the surface. If part of the silicon component is not exposed on the surface even when silicon exists at the center of the magnetite particle, the particles will have poor flowability, and contribute minimally to an improvement in electrical resistance.

If the silicon component is present only on the surface of the particle, on the other hand, the residual magnetization and the coercive force will become high relative to the particle size, making the properties ill-balanced. If the presence of the silicon component is not continuous from the center to the surface of the particle, an effect resulting from the binding of the silicon component to the metal component (to be described later on) will be poor.

The proportion of the silicon component based on the entire magnetite particle (may be referred to as the total amount of Si) is 0.2 to 1.0 wt. %. If the proportion of the silicon component is less than 0.2 wt. %, the magnetite particles will be inferior with minimal effect on the residual magnetization, coercive force, and flowability. If its proportion exceeds 1.0 wt. %, the electrical resistance, residual magnetization, coercive force, and flowability will be fully improved, but the environmental resistance will be deteriorated as typified by high hygroscopicity. Besides, this is not economical.

The compound of the silicon component with the metal component refers to a compound oxide having a silicon component incorporated into a metal oxide or hydroxide.

The silicon component exposed on the surface of the particle is in an amount determined by the following analytical method:

0.900 gram of a sample of magnetite particles is weighed, and 25 ml of a 1N solution of NaOH is added. The mixture is heated at 45° C. with stirring to dissolve the silicon component on the surface of the particles. The insolubles are filtered off, and then the filtrate is diluted to 125 ml of a solution with the addition of pure water. Silicon contained in the solution is determined by inductively coupled plasma atomic emission spectrochemical analysis (hereinafter referred to as ICP analysis).

Surface exposed silicon component (% by weight)={[Silicon (g/l) contained in the solution×125/1,000]/0.900 (g)}×100

The total amount of Si in the entire magnetite particle is determined by ICP analysis using a sample dissolved in a salt-hydrofluoric acid solution. The magnetite particles of the present invention need to have the silicon component present both at the center of and on the surface of the magnetite particle as described earlier.

It is also necessary in the invention that a compound of at least one metal component, which is selected from the group consisting of Zn, Mn, Cu, Ni, Co, Cr, Cd, Al, Sn, Mg, Ti and Ce, with the silicon component be present in an outer shell of the particle. The total amount of any of Zn, Mn, Cu, Ni, Co, Cr, Cd, Al, Sn, Mg, Ti and Ce present in the particle is preferably 0.2 to 4.0 wt. % expressed as any of the respective metal elements (hereinbelow, "the amount of the metal component" refers to the amount expressed as metal element).

If the total amount of the metal component is less than 0.2 wt. %, there will be insufficiency in the formation of the metal compound comprising at least one metal component bound to the silicon component in the outer shell of the particle, the metal component being selected from the group consisting of Zn, Mn, Cu, Ni, Co, Cr, Cd, Al, Sn, Mg, Ti and Ce. As a result, the effect of improving environmental resistance, electrical resistance, etc., the object of the present invention, will be diminished. If the total amount of the metal component is larger than 4.0 wt. %, the saturation magnetization will decline, and the oil absorption will increase. These are not preferred economically.

In regard to the distribution of the at least one metal component in the particle that is selected from the group consisting of Zn, Mn, Cu, Ni, Co, Cr, Cd, Al, Sn, Mg, Ti and Ce, it is more preferable to provide a gradient such that the concentration, based on Fe, of any of the Zn, Mn, Cu, Ni, Co, Cr, Cd, Al, Sn, Mg, Ti and Ce components is higher in the outer shell than in the inner shell of the magnetite particle. Besides, the total amount of any of the Zn, Mn, Cu, Ni, Co, Cr, Cd, Al, Sn, Mg, Ti and Ce components in the entire particle is preferably 0.2 to 4.0 wt. %, based on the magnetite particle, expressed as any of the respective metal elements.

The method of providing a gradient such that the above concentration is higher in the outer shell may be, but not restricted to, a publicly known method, such as a continuous change in the concentration, adjustment of pH, or progressive addition of any of the metal components. However, the effect of the invention cannot be fully obtained by the inorganic coating of the surface after completion of particle formation, thereby fixing an oxide or the like to the particle surface.

In the invention, assume that Fe is dissolved at dissolution rates of 20% and 40%, based on the total Fe content in the particle, from the surface of the particle. If, at these dissolution rates, the total amounts of any of the Zn, Mn, Cu, Ni, Co, Cr, Cd, Al, Sn, Mg, Ti and Ce components present are designated as $A_{20}$ (atomic %) and $A_{40}$ (atomic %) based on the dissolved Fe, it is preferred that the condition $A_{20}$ (atomic %)>$A_{40}$ (atomic %) be satisfied. More preferably, the condition $0.01 \leq (2 \times A_{40} - A_{20})/A_{20} < 1$ is fulfilled. Outside these conditions, more of the metal component for use in achieving the numerical target performance data will become necessary. This will not only be uneconomical, but will induce a decrease in saturation magnetization. Besides, the balance with the silicon component in the outer shell will be disturbed, making the desired balance between flowability and hygroscopicity difficult to achieve.

The magnetite particles of the invention preferably have an oil absorption of not more than 20 ml/100 g. If the oil absorption exceeds 20 ml/100 g, the miscibility and dispersibility of the particles with resin are likely to lower. After formation into a toner, the magnetic powder may become exposed, or the toner may spill, affecting the image characteristics.

The magnetite particles of the invention preferably have an electrical resistance of $1 \times 10^4$ Ωcm or more. A lower electrical resistance than $1 \times 10^4$ Ωcm would make it difficult for the toner to retain the required amount of electric charge, and is likely to exert adverse influence on toner characteristics, such as a decrease in image density.

The magnetite particles of the invention preferably have a moisture content, after moisture absorption under high-temperature, high-humidity conditions, of not more than 0.5%. At a moisture content in excess of 0.5%, there maybe a decline in environmental resistance, especially, a deterioration in charge characteristics after being left for along term under high humidity conditions. The moisture content after moisture absorption under the high-temperature, high-humidity conditions is a value measured at 150° C. by the Karl Fischer technique after moisture is absorbed for 3 days at 35° C. and humidity of 85%.

It has been found that the object of the present invention can be attained with the use of smaller amounts of silicon and metal components than before, by making the silicon component present continuously in a region from the center to the surface of the particle, making the silicon component exposed on the surface, and incorporating the metal component, and more preferably, by concentrating the silicon component and the metal component in a more outward portion of the magnetite particle.

The reason why the magnetite particles of the invention have achieved the intended object of the invention is not clear. However, it is presumed as follows: The compound comprising the silicon component and at least one metal component bound thereto which is selected from the group consisting of Zn, Mn, Cu, Ni, Co, Cr, Cd, Al, Sn, Mg, Ti and Ce has coated the outer shell of the particles uniformly. That is, because of the formation of this metal compound, the silicon component of the invention turns into very fine particles. Thus, as magnetite particles grow, such fine particles are taken up into the matrix particles smoothly and uniformly. Eventually, a thin, uniform layer of the silicon component is exposed on the surface of the magnetite particles. Even this small amount of the surface-exposed silicon component gives sufficient flowability. Moreover, its synergistic effect has resulted in the acquisition of magnetite particles having smooth particle surfaces, and possessing high electrical resistance and excellent environmental resistance.

In addition, the magnetite particles of the invention have magnetic characteristics well balanced against the particle size, are low in residual magnetization and coercive force, and high in the concentrations of the silicon component and the metal component, other than Fe, present on the surface of the particle. This may reduce magnetic agglomeration, further contributing to flowability and dispersibility.

Next, a preferred process for production according to the present invention will be described.

An aqueous solution consisting essentially of a ferrous salt, a silicon component, and 1.0 to 1.1 equivalents, based on iron, of an alkali metal base are mixed. The preferred ferrous salt is ferrous sulfate. The preferred silicon component is a solution containing a hydrous silicate colloid prepared from a silicic acid compound. For example, a silicic acid compound (including a hydrous compound) can be formed in the resulting particles by using sodium silicate or the like.

An oxygen-containing gas, preferably, air, is blown into the mixture to perform an oxidation reaction at 60 to 100° C., preferably 80 to 90° C., thereby forming seed crystals. The amount of this oxidation reaction is controlled by analyzing the amount of the unreacted ferrous hydroxide, and adjusting the amount of the oxygen-containing gas, during the reaction. In this oxidation reaction, it is vital to maintain the pH at 7 to 10, preferably 7 to 9.

When the amount of seed crystals formed reaches 1 to 30%, preferably, 5 to 25%, based on the total amount of oxidation, iron in a supplementary amount of 0.9 to 1.2 equivalents, preferably 1.05 to 1.15 equivalents, based on the initial alkali metal base, is added during the oxidation reaction. The iron used here is desirably in the form of a solution containing a ferrous salt such as ferrous sulfate.

The oxidation reaction is continued with the pH being maintained at 6 to 10, preferably 6 to 9, to grow particles. During this period, i.e., after the addition of the supplementary amount of iron, but before completion of the reaction, an aqueous solution containing at least one metal component selected from the group consisting of Zn, Mn, Cu, Ni, Co, Cr, Cd, Al, Sn, Mg, Ti and Ce is added to the reaction system. The metal element added for this purpose may be in the form of an aqueous solution or a hydroxide. If two or more metal components are added, they may be added separately or as a mixture.

After the reaction is completed, the resulting particles are washed, filtered, dried and ground by the customary methods to obtain magnetite particles.

In the present invention, pH during the oxidation reaction is preferably adjusted to 6 to 10, more preferably 6 to 9, as described earlier. This is because if the pH during the oxidation reaction is higher than 10, the silicon component will be easily taken up into the center of the magnetite particle. Consequently, the amounts of the silicon component present in the outer shell and exposed on the surface of the particle will be inadequate. The formation of a compound of the silicon component bound to the metal component will also be insufficient. In the contrary case, the silicon component will be minimally incorporated in the center of the particle, and will be precipitated on the surface.

Observation of the shape of particles in the course of the oxidation reaction has shown that the seed crystals formed in the initial phase of the reaction are unshaped, but include particles having a narrow particle size distribution. Then, in the latter-half of the reaction in the neutral to weakly alkaline range (pH 6 to 10), the particles gradually turn into a quasi-spherical shape.

EXAMPLES

The present invention will now be described in detail by reference to Examples.

Example 1

70 liters of an aqueous solution of ferrous sulfate containing 1.8 mols/$\lambda$ of $Fe^{2+}$, 643 g of sodium silicate with an Si grade of 13.4%, and 10.6 kg of sodium hydroxide were mixed to make the total volume 140 $\lambda$. With the temperature maintained at 90° C., air was blown at a rate of 20 $\lambda$/min into the mixture. When 20% of the initial amount of ferrous hydroxide was consumed, the formation of seed crystals was recognized.

Then, 10 $\lambda$ of an aqueous solution of ferrous sulfate having the same concentration as the one used initially for the reaction was added to an iron hydroxide slurry containing the seed crystalline particles to make the total volume 150 $\lambda$. After the system was found to be mixed sufficiently uniformly, air in an amount of 20 $\lambda$/min was blown into the mixture at a pH of 6 to 9 and a temperature of 90° C. to proceed with the oxidation reaction.

The progress rate of the reaction was examined with the concentration of the unreacted ferrous hydroxide being investigated halfway. When the progress rate reached 45% relative to the initial phase of the reaction, 10 $\lambda$ of an aqueous solution of nickel sulfate in a concentration of 0.1 mol/$\lambda$ was added over the course of about 100 minutes to a ferrous hydroxide slurry containing magnetite continued in the oxidation reaction. With the pH maintained at 6 to 9, the oxidation reaction was continued and completed.

The resulting magnetite slurry after completion of the reaction was washed, filtered, dried and ground by the customary methods.

The so obtained magnetite particles had a total amount of Si of 0.7 wt. %, an amount of surface-exposed Si of 0. 15 wt. %, and a total amount of Ni of 0.5 wt. %. These magnetite particles were measured for the $A_{20}$ atomic %, $A_{40}$ atomic %, particle size, magnetic characteristics, electrical resistance, amount of presence of the surface exposed silicon component, degree of agglomeration, moisture content after moisture absorption under high-temperature, high-humidity conditions, and oil absorption. The results are shown in Table 1.

Methods of Measurement

① Particle size

The diameters of the particles were measured from a transmission electron micrograph (X30,000), and the average of the particle diameters was taken as the particle size.

② Magnetic characteristics

Measured in an applied magnetic field of 10 KOe by means of "VSM-P7" (a vibration sample type magnetometer, Toei Industries).

③ Electrical resistance 10 grams of a sample were placed in a holder, and molded into a 25 mm$\phi$ tablet under a pressure of 600 kg/cm$^2$. An electrode was attached to the tablet, whose electrical resistance was measured at a pressure of 150 kg/cm$^2$. The electrical resistance of the magnetite particles was calculated from the thickness, cross-sectional area and electrical resistance of the sample used in the measurement.

④ Moisture content after moisture absorption under high-temperature, high-humidity conditions (Karl Fischer technique)

Magnetite particles were predried in a dryer at 150° C., and caused to absorb moisture for 3 days at 35° C. and 85% RH by the use of a high temperature, high humidity tester ("LHL-111", TABAI ESPEC CORP.). Then, moisture in the magnetite particles was evaporated at 150° C. by WATER VAPORIZER VA-05 (Mitsubishi Chemical Corp.), and detected by MOISTURE METER CA-03 (MITSUBISHI KASEI Corporation) to determine the moisture content of the magnetite particles.

⑤ Oil absorption

Measured by JIS K 5101.

⑥ $A_{20}$, atomic %, $A_{40}$ atomic %

25 grams of a sample was added into a 1N aqueous solution of $H_2SO_4$, and gradually dissolved at 60° C. During the process of dissolution, the solution was collected in an amount of 20 ml each. The insolubles were filtered off with a membrane filter, and then the filtrate was determined by inductively coupled plasma atomic emission spectrochemical analysis (ICP analysis). The total amounts of the added metal component(s) at iron dissolution rates of 40% and 20% were taken as the proportions of the metal component (s) relative to the dissolved iron.

⑦ Degree of agglomeration

Measured at a vibration time of 65 sec using Powder Tester Type PT-E (HOSOKAWA MICRON CORP.). The results of measurement were calculated using a predetermined calculation formula to determine the degree of agglomeration. The degree of agglomeration was evaluated as low when it was less than 35%, and high when it was 35% or more.

Example 2

Magnetite particles were obtained by the same procedure as in Example 1, except that the total amount of Si, the amount of surface exposed Si, and the total amount of metals were adjusted to 0.5 wt. %, 0.11 wt. % and 4.0 wt. %, respectively, that the types of metals added during the reaction were Zn, Co, Ni, Mg, Ti and Mn, and that the pH for the reaction after addition of the supplementary amount of iron was varied in the range of 6 to 10.

Example 3

Magnetite particles were obtained by the same procedure as in Example 1, except that the total amount of Si, the amount of surface exposed Si, and the total amount of metals were adjusted to 0.7 wt. %, 0.25 wt. % and 2.9 wt. %, respectively, that the types of metals added during the reaction were Zn, Mn and Cu, and that the pH for the reaction after addition of the supplementary amount of iron was varied in the range of from 6 to 8.

Example 4

Magnetite particles were obtained by the same procedure as in Example 1, except that the total amount of Si, the amount of surface exposed Si, and the total amount of metals were adjusted to 0.5 wt. %, 0.11 wt. % and 1.4 wt. %, respectively, and that the types of metals added during the reaction were Zn and Mn.

Example 5

Magnetite particles were obtained by the same procedure as in Example 1, except that the total amount of Si, the amount of surface exposed Si, and the total amount of metals were adjusted to 0.3 wt. %, 0.04 wt. % and 2.5 wt. %, respectively, and that the types of metals added during the reaction were Zn, Mn, Cu and Ni.

Example 6

Magnetite particles were obtained by the same procedure as in Example 1, except that the total amount of Si, the amount of surface exposed Si, and the total amount of metal were adjusted to 0.9 wt. %, 0.02 wt. % and 0.3 wt. %, respectively, that the type of metal added during the reaction was Co, and that the pH for the reaction after addition of the supplementary amount of iron was varied in the range of from 6 to 10.

Example 7

Magnetite particles were obtained by the same procedure as in Example 1, except that the total amount of Si, the amount of surface exposed Si, and the total amount of metal were adjusted to 0.5 wt. %, 0.17 wt. % and 0.9 wt. %, respectively, that the type of metal added during the reaction was Ce, and that the pH for the reaction after addition of the supplementary amount of iron was varied in the range of from 6 to 9.

Example 8

Magnetite particles were obtained by the same procedure as in Example 1, except that the total amount of Si, the amount of surface exposed Si, and the total amount of metal were adjusted to 0.5 wt. %, 0.17 wt. % and 0.9 wt. %, respectively, that the types of metals added during the reaction were Al, Cr, Cd and Sn, and that the pH for the reaction after addition of the supplementary amount of iron was varied in the range of from 6 to 9.

Comparative Example 1

Magnetite particles were obtained by the same procedure as in Example 4, except that the gradient of the metal component in the particle was varied.

Comparative Example 2

Magnetite particles were obtained by the same procedure as in Example 1, except that no metal was added, and that the total amount of Si, and the amount of surface exposed Si were set at 1.5 wt. % and 0.55 wt. %, respectively.

Comparative Example 3

Magnetite particles were obtained by the same procedure as in Example 1, except that the total amount of Si, and the total amount of metals were adjusted to 0.8 wt. % and 2.9 wt. %, respectively, the amount of surface exposed Si was set to be zero, the types of metals added during the reaction were Zn, Mn and Ni, and the pH for the reaction after addition of the supplementary amount of iron was varied in the range of from 10 to 11.

Comparative Example 4

Magnetite particles were obtained by the same procedure as in Example 2, except that the total amount of the metals was adjusted to 5.5 wt. %.

Comparative Example 5

Magnetite particles were obtained by the same procedure as in Example 1, except that no sodium silicate was added, the total amount of metals was adjusted to 2.0 wt. %, and the types of metals added during the reaction were Zn, Mn and Ni.

The results are shown in Table 1.

TABLE 1

| | pH for reaction after iron addition | Type of metal(s) added | Total amount of Si wt. % | Amount of Surface exposed Si wt. % | Total amount of metal(s) wt. % | $A_{20}$ atom. % | $A_{40}$ atom. % | Particle size μm | $\sigma_s$ emu/g | $\sigma_r$ emu/g | Hc Oe | Electrical resistance Ωcm | Oil absorption mL/100 g | Moisture content wt. % | Degree of agglomeration |
|---|---|---|---|---|---|---|---|---|---|---|---|---|---|---|---|
| Ex. 1 | 6–9 | Ni | 0.7 | 0.15 | 0.5 | 2.2 | 1.8 | 0.28 | 83.5 | 3.7 | 48 | $1.2 \times 10^5$ | 19 | 0.42 | low |
| Ex. 2 | 6–10 | Zn,Co,Ni,Mg,Ti,Mn | 0.5 | 0.11 | 4.0 | 28.9 | 14.6 | 0.19 | 80.5 | 4.8 | 55 | $5.0 \times 10^5$ | 18 | 0.38 | low |
| Ex. 3 | 6–8 | Zn,Mn,Cu | 0.7 | 0.25 | 2.9 | 19.9 | 10.3 | 0.3 | 81.3 | 3.4 | 40 | $2.0 \times 10^5$ | 19 | 0.45 | low |
| Ex. 4 | 6–9 | Zn,Mn | 0.5 | 0.11 | 1.4 | 7.2 | 3.9 | 0.31 | 84.0 | 3.6 | 43 | $1.4 \times 10^5$ | 17 | 0.37 | low |
| Ex. 5 | 6–9 | Zn,Mn,Cu,Ni | 0.3 | 0.04 | 2.5 | 19.9 | 10.3 | 0.18 | 85.5 | 5.8 | 65 | $5.0 \times 10^4$ | 17 | 0.35 | low |
| Ex. 6 | 6–10 | Co | 0.9 | 0.02 | 0.3 | 1.9 | 1.0 | 0.21 | 82.0 | 4.4 | 51 | $5.0 \times 10^4$ | 20 | 0.38 | low |
| Ex. 7 | 6–9 | Ce | 0.5 | 0.17 | 0.9 | 5.5 | 3.0 | 0.20 | 81.0 | 5.1 | 62 | $1.2 \times 10^5$ | 20 | 0.39 | low |
| Ex. 8 | 6–9 | Al,Cr,Cd,Sn | 0.5 | 0.11 | 1.0 | 5.0 | 2.9 | 0.23 | 82.0 | 4.0 | 48 | $5.0 \times 10^5$ | 20 | 0.40 | low |

TABLE 1-continued

|  | pH for reaction after iron addition | Type of metal(s) added | Total amount of Si wt. % | Amount of Surface exposed Si wt. % | Total amount of metal(s) wt. % | $A_{20}$ atom. % | $A_{40}$ atom. % | Particle size μm | $\sigma_s$ emu/g | $\sigma_r$ emu/g | Hc Oe | Electrical resistance Ωcm | Oil absorption mL/100 g | Moisture content wt. % | Degree of agglomeration |
|---|---|---|---|---|---|---|---|---|---|---|---|---|---|---|---|
| Comp Ex. 1 | 6–9 | Zn,Mn | 0.5 | 0.11 | 2.9 | 1.2 | 4.3 | 0.2.2 | 82.5 | 4.0 | 48 | $9.0 \times 10^3$ | 21 | 0.45 | high |
| Comp Ex. 2 | 6–9 | — | 1.5 | 0.55 | — | — | — | 0.21 | 77.0 | 4.5 | 53 | $5.0 \times 10^6$ | 26 | 1.20 | low |
| Comp Ex. 3 | 10–11 | Zn,Nn,Ni | 0.8 | 0.00 | 2.9 | 19.9 | 10.3 | 0.30 | 80.5 | 5.9 | 60 | $4.0 \times 10^4$ | 18 | 0.35 | high |
| Comp Ex. 4 | 6–9 | Zn,Co,Ni, Cu,Ti,Mn | 0.5 | 0.11 | 5.5 | 39.0 | 20.5 | 0.22 | 74.3 | 4.8 | 57 | $3.0 \times 10^6$ | 23 | 0.75 | high |
| Comp Ex. 5 | 6–9 | Zn,Mn,Ni | — | — | 2.0 | 10.1 | 5.5 | 0.23 | 85.5 | 7.5 | 67 | $3.0 \times 10^3$ | 19 | 0.45 | high |

*$A_{20}$ and $A_{40}$ refer to the total amounts (atomic %) of metal component(s) based on the amount of Fe dissolved at dissolution rates of 20% and 40%.

As the results of Table 1 indicate, the magnetite particles of Examples 1 to 8 obtained by the present invention were satisfactory in all of electrical resistance, residual magnetization, oil absorption, moisture content, and degree of agglomeration.

In contrast, the magnetite particles of Comparative Example 1 had a low metal component content in the particle surface. Thus, the electrical resistance and the degree of agglomeration were both inferior.

The magnetite particles of Comparative Example 2 had a large amount of Si, and much Si was exposed on the surface of the particles. Thus, the electrical resistance and the degree of agglomeration were satisfactory, but the oil absorption and the moisture content were both high.

With the magnetite particles of Comparative Example 3 that contained silicon at the center of the particles, but had no silicon on the surface, the oil absorption and the moisture content were low. However, because of the absence of the silicon component on the surface of the particles, the electrical resistance was low relative to its amount added. Moreover, the degree of agglomeration was high, resulting in poor flowability.

With the magnetite particles of Comparative Example 4 with a high metal content, the electrical resistance was fully improved, but the oil absorption, moisture content, and degree of agglomeration were all high, and the saturation magnetization was decreased.

With the magnetite particles of Comparative Example 5 containing no silicon at the center of the particles, the residual magnetization was high relative to the particle size, because of the absence of silicon at the center of the particles. Moreover, the electrical resistance was low, and the flowability was poor.

As discussed above, according to the magnetite particles of the present invention, the silicon component is present continuously in the region from the center to the surface of the particle, and the surface of the particle is coated with the metal component bound to the silicon component. Thus, the oil absorption is low, the electrical resistance is high, and the magnetic characteristics, environmental resistance, and flowability are excellent, making the magnetite particles preferred for use in a magnetic toner for electrostatic copying.

What is claimed is:

1. Magnetite particles continuously containing 0.2 to 1.0 wt. %, based on magnetite, of a silicon component expressed as silicon, in a region ranging from the center to the surface of the particle; 0.01 to 0.3 wt. % of said silicon component being exposed on the surface of the particle; and an outer shell of the particle being coated with a metal compound comprising at least one metal component bound to the silicon component, said metal component being selected from the group consisting of Zn, Mn, Cu, Ni, Co, Cr, Cd, Al, Sn, Mg, Ti and Ce.

2. The magnetite particles of claim 1, wherein a gradient is provided such that the concentration, based on Fe, of any of the metal components selected from the group consisting of Zn, Mn, Cu, Ni, Co, Cr, Cd, Al, Sn, Mg, Ti and Ce is higher in the outer shell than in an inner shell of the magnetite particle, and also higher in a superficial portion of the outer shell, and the total amount of any of the metal components selected from the group consisting of Zn, Mn, Cu, Ni, Co, Cr, Cd, Al, Sn, Mg, Ti and Ce in the entire particle is 0.2 to 4.0 wt. %, based on the magnetite particle, expressed as any of the respective metal elements.

3. The magnetite particles of claim 1, which have an oil absorption of not more than 20 ml/100 g, an electrical resistance of not lower than $10 \times^4$ Ωcm, and a moisture content, after moisture absorption under high-temperature, high-humidity conditions, of not more than 0.5%.

4. The magnetite particles of claim 1, which have a residual magnetization $\sigma_r$ of not more than 6 emu/g, and a degree of agglomeration of not higher than 35%.

5. A process for producing the magnetite particles of claim 1, comprising:

mixing an aqueous solution consisting essentially of a ferrous salt, a silicon component, and 1.0 to 1.1 equivalents, based on iron, of an alkali metal base;

performing an oxidation reaction of the mixture while maintaining its pH at 7 to 10;

adding iron, in a supplementary amount corresponding to 0.9 to 1.2 equivalents based on the initial alkali metal base, during the reaction;

continuing the oxidation reaction while maintaining the mixture at a pH of 6 to 10; and adding at least one metal component selected from the group consisting of Zn, Mn, Cu, Ni, Co, Cr, Cd, Al, Sn, Mg, Ti and Ce, after the addition of the supplementary amount of iron, but before completion of the oxidation reaction, while adjusting the concentration of the metal component(s) to be higher in an outer shell portion and a superficial portion of the particle.

* * * * *